US006547663B1

(12) United States Patent
Delott et al.

(10) Patent No.: US 6,547,663 B1
(45) Date of Patent: Apr. 15, 2003

(54) GAMING MACHINE WITH PLAYER CONTROLLED PAYOUT RATE

(75) Inventors: Roger A. Delott, Chicago, IL (US); Alfred Thomas, Chicago, IL (US)

(73) Assignee: WMS Gaming, Inc., Chicago, IL (US)

( * ) Notice: Subject to any disclaimer, the term of this patent is extended or adjusted under 35 U.S.C. 154(b) by 0 days.

(21) Appl. No.: 09/044,959

(22) Filed: Mar. 20, 1998

(51) Int. Cl.[7] .............................................. A63F 13/10

(52) U.S. Cl. ........................ 463/25; 463/20; 273/138.1; 453/29

(58) Field of Search .............................. 463/20, 21, 22, 463/16–19, 25, 26, 23; 273/143 R, 138.1, 138.2, 138 A; 194/342, 350, 351, 353; 453/18, 29

(56) References Cited

U.S. PATENT DOCUMENTS

| | | | | |
|---|---|---|---|---|
| 4,721,307 A | | 1/1988 | Okada | 273/143 R |
| 5,205,555 A | | 4/1993 | Hamano | 273/143 R |
| 5,259,616 A | | 11/1993 | Bergmann | |
| 5,401,024 A | | 3/1995 | Simunek | 273/138 |
| 5,449,173 A | | 9/1995 | Thomas et al. | 273/143 R |
| 5,456,465 A | * | 10/1995 | Durham | 463/21 |
| 5,584,763 A | * | 12/1996 | Kelly et al. | 463/16 |
| 5,697,843 A | | 12/1997 | Manship et al. | 463/20 |
| 5,788,573 A | | 8/1998 | Baerlocher et al. | 463/16 |
| 5,823,874 A | | 10/1998 | Adams | 463/17 |
| 5,848,932 A | * | 12/1998 | Adams | 463/20 |
| 5,980,384 A | * | 11/1999 | Barrie | 463/16 |
| 6,059,289 A | * | 5/2000 | Vancura | 273/143 R |
| 6,173,955 B1 | * | 1/2001 | Perrie et al. | 273/146 |

FOREIGN PATENT DOCUMENTS

| | | | |
|---|---|---|---|
| AU | 565 987 A | 10/1987 | |
| DE | 41 21 624 C | 11/1992 | |
| EP | 0 798 676 A | 10/1997 | |
| GB | 2096376 | 10/1982 | G07F/17/34 |
| GB | 2153572 | 8/1985 | G07F/17/34 |
| GB | 2153572 | 8/1995 | G07F/17/34 |
| WO | WO 91 10974 | 7/1991 | |

OTHER PUBLICATIONS

“Pirate’s Thunder” Game Brochure 1996.
“EuroSlot” Magazine Showing “Wheel of Fortune” Game/ Apr, 94 Issue.

* cited by examiner

*Primary Examiner*—Mark Sager
*Assistant Examiner*—Steven Ashburn
(74) *Attorney, Agent, or Firm*—Piper Rudnick

(57) ABSTRACT

A gaming machine, and a method of operating a gaming machine, including a set of spinning reels having a plurality of symbols thereon, a stepper motor for spinning and stopping said reels to display symbols on a payline and a processor operating according to a game program for controlling the stepper motor, said processor randomly selecting symbols to be displayed by said spinning reels, determining if the selected symbols constitute a winning combination, and, if so, a corresponding prize amount, and paying out said prize as a plurality of credits, the processor adjusting the rate the credits are consecutively dispensed during a credit payout as controlled by a player.

6 Claims, 8 Drawing Sheets

| | REE 1 | REEL 2 | REEL3 |
|---|---|---|---|
| 1 | STAR | 2BAR | STAR |
| 2 | BLANK | BLANK | BLANK |
| 3 | 2BAR | 1BAR | 1BAR |
| 4 | BLANK | BLANK | BLANK |
| 5 | 3BAR | MEGA | 2BAR |
| 6 | BLANK | BLANK | BLANK |
| 7 | 1BAR | 2BAR | 3BAR |
| 8 | BLANK | BLANK | BLANK |
| 9 | 2BAR | 1BAR | 2BAR |
| 10 | BLANK | BLANK | BLANK |
| 11 | SEVEN | SEVEN | SEVEN |
| 12 | BLANK | BLANK | BLANK |
| 13 | 1BAR | 1BAR | 1BAR |
| 14 | BLANK | BLANK | BLANK |
| 15 | 2BAR | 2BAR | SEVEN |
| 16 | BLANK | BLANK | BLANK |
| 17 | 1BAR | 3BAR | 2BAR |
| 18 | BLANK | BLANK | BLANK |
| 19 | 3BAR | 2BAR | 1BAR |
| 20 | BLANK | BLANK | BLANK |
| 21 | 1BAR | SEVEN | 3BAR |
| 22 | BLANK | BLANK | BLANK |

FIG. 5

| INDEX | REEL 1 | REEL 2 | REEL 3 | NO OF WAYS TO ACHIEVE | FORMULA 1 CREDIT | FORMULA 2 CREDIT | FORMULA 3 CREDIT | FORMULA MAXBET | PREDICTED VALUE 1 CREDIT | PREDICTED VALUE 2 CREDIT | PREDICTED VALUE 3 CREDIT | PREDICTED VALUE MAXBET |
|---|---|---|---|---|---|---|---|---|---|---|---|---|
| 1 | STAR | MEGA | STAR | 1 | $60X_1$ | $120X_1$ | $200X_1$ | $200X_2$ | 266.6872 | 533.3745 | 888.9575 | 1416.521 |
| 3 | SEVEN | MEGA | SEVEN | 2 | $40X_1$ | $80X_1$ | $120X_1$ | $120X_2$ | 177.7915 | 355.583 | 533.3745 | 84.99126 |
| 2 | SEVEN | SEVEN | SEVEN | 4 | 40 | 80 | 120 | 120 | 40 | 80 | 120 | 120 |
| 3 | 3BAR | MEGA | 3BAR | 4 | $30X_1$ | $60X_1$ | $90X_1$ | $90X_2$ | 133.3436 | 266.6872 | 400.0309 | 637.4344 |
| 4 | 3BAR | 3BAR | 3BAR | 4 | 30 | 60 | 90 | 90 | 30 | 60 | 90 | 90 |
| 5 | 2BAR | MEGA | 2BAR | 9 | $20X_1$ | $40X_1$ | $60X_1$ | $60X_2$ | 88.89575 | 177.7915 | 266.6872 | 424.9563 |
| 6 | 2BAR | 2BAR | 2BAR | 36 | 20 | 40 | 60 | 60 | 20 | 40 | 60 | 60 |
| 7 | 1BAR | MEGA | 1BAR | 12 | $10X_1$ | $20X_1$ | $30X_1$ | $30X_2$ | 44.44787 | 88.89575 | 133.3436 | 212.4781 |
| 8 | 1BAR | 1BAR | 1BAR | 36 | 10 | 20 | 30 | 30 | 10 | 20 | 30 | 30 |
| 9 | ANYBAR | MEGA | ANYBAR | 47 | $4X_1$ | $8X_1$ | $12X_1$ | $12X_2$ | 17.77915 | 35.5583 | 53.33745 | 84.99126 |
| 10 | ANYBAR | ANYBAR | ANYBAR | 500 | 4 | 8 | 12 | 12 | 4 | 8 | 12 | 12 |
| 11 | ANYTHING | MEGA | STAR | 21 | $3X_1$ | $6X_1$ | $9X_1$ | $9X_2$ | 13.33436 | 26.66872 | 40.00309 | 63.74344 |
| 12 | STAR | MEGA | ANYTHING | 21 | $3X_1$ | $6X_1$ | $9X_1$ | $9X_2$ | 13.33436 | 26.66872 | 40.00309 | 63.74344 |
| 13 | ANYTHING | MEGA | ANYTHING | 367 | $X_1$ | $2X_1$ | $3X_1$ | $3X_2$ | 4.444787 | 8.889575 | 13.33436 | 21.24781 |
| 14 | STAR | ANYTHING | STAR | 21 | 2 | 4 | 6 | 6 | 2 | 4 | 6 | 6 |
| 15 | ANYTHING | ANYTHING | STAR | 441 | 1 | 2 | 3 | 3 | 1 | 2 | 3 | 3 |
| 16 | STAR | ANYTHING | ANYTHING | 441 | 1 | 2 | 3 | 3 | 1 | 2 | 3 | 3 |

FIG. 7A

| INDEX | REEL 1 | REEL 2 | REEL 3 |
|---|---|---|---|
| 1 | 3 | 2 | 2 |
| 2 | 1 | 1 | 1 |
| 3 | 3 | 3 | 3 |
| 4 | 1 | 1 | 1 |
| 5 | 2 | 2 | 2 |
| 6 | 1 | 1 | 1 |
| 7 | 2 | 2 | 2 |
| 8 | 1 | 1 | 1 |
| 9 | 3 | 2 | 3 |
| 10 | 1 | 1 | 1 |
| 11 | 2 | 2 | 2 |
| 12 | 1 | 1 | 1 |
| 13 | 3 | 2 | 2 |
| 14 | 1 | 1 | 1 |
| 15 | 3 | 2 | 3 |
| 16 | 1 | 1 | 1 |
| 17 | 2 | 1 | 3 |
| 18 | 1 | 2 | 1 |
| 19 | 2 | 2 | 2 |
| 20 | 1 | 1 | 1 |
| 21 | 2 | 2 | 2 |
| 22 | 1 | 1 | 1 |
| 23 | 3 | 2 | 2 |
| 24 | 1 | 1 | 1 |
| 25 | 2 | 2 | 2 |
| 26 | 1 | 1 | 1 |
| 27 | 2 | 2 | 2 |
| 28 | 1 | 1 | 1 |
| 29 | 2 | 2 | 2 |
| 30 | 1 | 1 | 1 |
| 31 | 2 | 2 | 2 |
| 32 | 1 | 1 | 1 |
| 33 | 3 | 3 | 3 |
| 34 | 1 | 1 | 1 |
| 35 | 2 | 2 | 2 |
| 36 | 1 | 1 | 1 |

FIG. 7B

| INDEX | REEL 1 | REEL 2 | REEL 3 |
|---|---|---|---|
| 1 | 2 | 2 | 2 |
| 2 | 1 | 2 | 1 |
| 3 | 3 | 3 | 5 |
| 4 | 1 | 1 | 1 |
| 5 | 2 | 3 | 2 |
| 6 | 1 | 1 | 1 |
| 7 | 2 | 2 | 2 |
| 8 | 1 | 1 | 1 |
| 9 | 5 | 3 | 3 |
| 10 | 1 | 1 | 1 |
| 11 | 5 | 5 | 5 |
| 12 | 1 | 1 | 1 |
| 13 | 2 | 3 | 2 |
| 14 | 1 | 1 | 1 |
| 15 | 2 | 2 | 2 |
| 16 | 1 | 1 | 1 |
| 17 | 3 | 3 | 3 |
| 18 | 1 | 1 | 1 |
| 19 | 2 | 5 | 2 |
| 20 | 1 | 1 | 1 |
| 21 | 5 | 5 | 3 |
| 22 | 1 | 1 | 1 |
| 23 | 2 | 2 | 2 |
| 24 | 1 | 1 | 1 |
| 25 | 3 | 3 | 2 |
| 26 | 1 | 1 | 1 |
| 27 | 2 | 3 | 2 |
| 28 | 1 | 1 | 1 |
| 29 | 2 | 2 | 2 |
| 30 | 1 | 1 | 1 |
| 31 | 2 | 2 | 2 |
| 32 | 1 | 1 | 1 |
| 33 | 3 | 5 | 2 |
| 34 | 1 | 1 | 1 |
| 35 | 3 | 5 | 1 |
| 36 | 1 | 1 | 1 |

FIG. 7C

| | REEL 1 | | REEL 2 | | REEL 3 | |
|---|---|---|---|---|---|---|
| | MULTIPLIER | IMAGE POS | MULTIPLIER | IMAGE POS | MULTIPLIER | IMAGE POS |
| 1 | 1 | 1 | 1 | 1 | 1 | 1 |
| 2 | 1 | 1 | 1 | 1 | 1 | 1 |
| 3 | 1 | 1 | 1 | 1 | 1 | 1 |
| 4 | 2 | 2 | 2 | 2 | 2 | 2 |
| 5 | 2 | 2 | 2 | 2 | 2 | 2 |
| 6 | 2 | 2 | 2 | 2 | 2 | 2 |
| 7 | 1 | 3 | 2 | 2 | 1 | 3 |
| 8 | 1 | 3 | 1 | 3 | 1 | 3 |
| 9 | 1 | 3 | 1 | 3 | 1 | 3 |
| 10 | 3 | 4 | 1 | 3 | 1 | 3 |
| 11 | 3 | 4 | 3 | 4 | 1 | 3 |
| 12 | 3 | 4 | 3 | 4 | 3 | 4 |
| 13 | 3 | 4 | 3 | 4 | 3 | 4 |
| 14 | 3 | 4 | 3 | 4 | 3 | 4 |
| 15 | 1 | 5 | 1 | 5 | 1 | 5 |
| 16 | 1 | 5 | 1 | 5 | 1 | 5 |
| 17 | 1 | 5 | 1 | 5 | 1 | 5 |
| 18 | 1 | 5 | 1 | 5 | 1 | 5 |
| 19 | 2 | 6 | 2 | 6 | 2 | 6 |
| 20 | 2 | 6 | 2 | 6 | 2 | 6 |
| 21 | 2 | 6 | 2 | 6 | 2 | 6 |
| 22 | 1 | 7 | 2 | 6 | 2 | 6 |
| 23 | 1 | 7 | 1 | 7 | 1 | 7 |
| 24 | 1 | 7 | 1 | 7 | 1 | 7 |
| 25 | 1 | 7 | 1 | 7 | 1 | 7 |
| 26 | 3 | 8 | 1 | 7 | 1 | 7 |
| 27 | 3 | 8 | 3 | 8 | 3 | 8 |
| 28 | 3 | 8 | 3 | 8 | 3 | 8 |
| 29 | 3 | 8 | 1 | 9 | 1 | 9 |
| 30 | 1 | 9 | 1 | 9 | 1 | 9 |
| 31 | 1 | 9 | 1 | 9 | 1 | 9 |
| 32 | 1 | 9 | 1 | 9 | 2 | 10 |
| 33 | 1 | 9 | 2 | 10 | 2 | 10 |
| 34 | 2 | 10 | 2 | 10 | 2 | 10 |
| 35 | 2 | 10 | 2 | 10 | 2 | 10 |
| 36 | 2 | 10 | 2 | 10 | 2 | 10 |

FIG. 8

| INDEX | MULTIPLIER |
|---|---|
| 1 | BLANK |
| 2 | 2 |
| 3 | BLANK |
| 4 | 3 |
| 5 | BLANK |
| 6 | 2 |
| 7 | BLANK |
| 8 | 3 |
| 9 | BLANK |
| 10 | 2 |

FIG. 9

| INDEX | REEL 1 | REEL 2 | REEL 3 | EXPECTED PAYOFF/PLAY FOR EACH COMBINATION | | | |
|---|---|---|---|---|---|---|---|
| | | | | 1 CREDIT | 2 CREDIT | 3 CREDIT | MAXBET |
| 1 | STAR | MEGA | STAR | 0.0250458 | 0.0500915 | 0.0834859 | 0.1330316 |
| 3 | SEVEN | MEGA | SEVEN | 0.0333943 | 0.0667887 | 0.0100183 | 0.159638 |
| 2 | SEVEN | SEVEN | SEVEN | 0.0150263 | 0.0300526 | 0.0450789 | 0.0450789 |
| 3 | 3BAR | MEGA | 3BAR | 0.0500915 | 0.0100183 | 0.1502746 | 0.239457 |
| 4 | 3BAR | 3BAR | 3BAR | 0.0112697 | 0.0225394 | 0.0338092 | 0.0338092 |
| 5 | 2BAR | MEGA | 2BAR | 0.0751373 | 0.1502746 | 0.2254118 | 0.3591854 |
| 6 | 2BAR | 2BAR | 2BAR | 0.0676183 | 0.1352367 | 0.202855 | 0.202855 |
| 7 | 1BAR | MEGA | 1BAR | 0.0500915 | 0.100183 | 0.1502746 | 0.239457 |
| 8 | 1BAR | 1BAR | 1BAR | 0.0338092 | 0.0676183 | 0.1014275 | 0.1014275 |
| 9 | ANYBAR | MEGA | ANYBAR | 0.0784767 | 0.1569534 | 0.2354301 | 0.3751492 |
| 10 | ANYBAR | ANYBAR | ANYBAR | 0.1878287 | 0.3756574 | 0.5634861 | 0.5634861 |
| 11 | ANYTHING | MEGA | STAR | 0.026298 | 0.0525961 | 0.0788941 | 0.1257149 |
| 12 | STAR | MEGA | ANYTHING | 0.026298 | 0.0525961 | 0.0788941 | 0.1257149 |
| 13 | ANYTHING | MEGA | ANYTHING | 0.1531966 | 0.3063931 | 0.4595897 | 0.7323392 |
| 14 | STAR | ANYTHING | STAR | 0.0039444 | 0.0078888 | 0.0118332 | 0.0118332 |
| 15 | ANYTHING | ANYTHING | STAR | 0.0414162 | 0.0828325 | 0.1242487 | 0.1242487 |
| 16 | STAR | ANYTHING | ANYTHING | 0.0414162 | 0.0828325 | 0.1242487 | 0.1242487 |
| | | TOTAL | | 0.9203589 | 1.8407177 | 2.7694252 | 3.6966744 |
| | | PERCENTAGE PAYOFF | | 92.035886 | 92.035886 | 92.314172 | 92.41686 |

GAMING MACHINE WITH PLAYER CONTROLLED PAYOUT RATE

BACKGROUND OF THE INVENTION

This invention relates to gaming machines. More specifically, it relates to spinning reel type slot machines.

Spinning reel slot machines have maintained their popularity, evolving from electro-mechanical devices to the present day devices which employ microprocessor control. In modern devices, the spinning reels are used merely as a display to advise a player if she has won or lost a game of chance played entirely in a computer memory according to the rules embedded in a computer program. Such machines may have further displays, in addition to the reels, on which other aspects of the game are displayed. In the past, such displays have included "trail games" wherein an indicator proceeds along a board game style trail providing different features. These features might include nudges and additional gamble features awarding prizes.

Spinning reel slot machines generally provide different symbols on each of the reels, and give payoffs when a plurality of the symbols displayed in a certain position on each reel, are the same. The relevant position is usually along a horizontal line referred to as the payline. However, other payoff schemes have been developed. For example, U.S. Pat. No. 5,205,555 (Masahiro) discloses a machine with values on the reels, instead of symbols. A mathematical operation is performed on values displayed on the payline to determine the value of an award. This type of scheme has the disadvantage that it is not easily understood by regular players of the slot machines, who are used to a system of symbols and payoffs.

It has also become common practice to provide spinning reel slot machines with a secondary game which is activated only when certain special symbols appear in winning combinations. Frequently, the secondary game will be provided on a dot matrix screen disposed above the reels, and will be generated by a computer program. Often, during the course of the operation of the secondary game, a multiplier is established, by which the standard payoff for the winning combination is multiplied to provide the actual payoff. A game with such a feature is discussed in U.S. patent application Ser. No. 08/998,139 also assigned to the present assignee. This type of game has the advantage that bigger jackpots can be provided when both a winning combination on the reels and a high multiplier on the feature occur, because such occurrences can be made to be very rare. It is important that this feature is simple to understand and exciting so that a player will choose the machine in question over other spinning reel slot machines.

It is also important that it is straightforward for a machine operator to adjust the payoff rate, and it is therefore advantageous in the payoff rate is related to the parameters used in the payoff tables in as simple a way as possible.

Spinning reel slot machines known in the art pay out wins at a set rate per second. This rate. is generally fairly slow to give the impression that a lot of credits are being paid out, and to increase the interest of other players in the machine. However, this slow payoff rate can be annoying to players who are well acquainted with the game and wish to resume play as soon as: possible. The present invention provides a player selectable payoff rate.

SUMMARY OF THE INVENTION

In a first aspect, the present invention is a spinning reel slot machine in which selected payoffs are multiplied by a variable value which is independent of the winning symbol combination whereby to increase player interest in the game.

By multiplying the payoff for selected wins by a variable value, the maximum possible payoff achievable is increased significantly, whereby increasing player interest. However, as only selected payoffs are multiplied by the variable value, the overall payoff is not increased significantly. Furthermore, as the variable multiplier is not dependent on the selected payoff, it is very straightforward to calculate and,modify the overall payoff of the machine.

The present invention provides a spinning reel slot machine which provides a secondary game when certain conditions are met in the combination of symbols displayed on the reels after a spin. The secondary game takes place on a display and involves the simulation of a set of reels on the display. The spinning of these reels is simulated and the combination of symbols which results from the simulated spin is used to generate a multiplier for a payoff obtained in the spin of the actual reels.

In a specific implementation of the invention, the symbols simulated on the reels are numerical values and the product of these values is used as the multiplier.

In an a adaptation of this implementation, if a multiplier value of 1 is obtained, the multiplier is increased to 2, so that a multiplier greater than 1 is always obtained.

BRIEF DESCRIPTION OF THE DRAWINGS

FIG. 5 is a table showing the prizes awarded in the four modes of the example of the first embodiment.

FIGS. 7*a,* 7*b* and 7*c* are tables showing reel strips used to calculate a multiplier value.

FIG. 8 is a table showing a reel strip mapped onto by the reel strip of FIG. 7*c*.

FIG. 9 is a table showing the expected payoff for each winning combination in each mode, the sum of the expected payoffs, and the percentage total payoff.

DETAILED DESCRIPTION OF A SPECIFIC EMBODIMENT OF THE INVENTION

Figure 1:
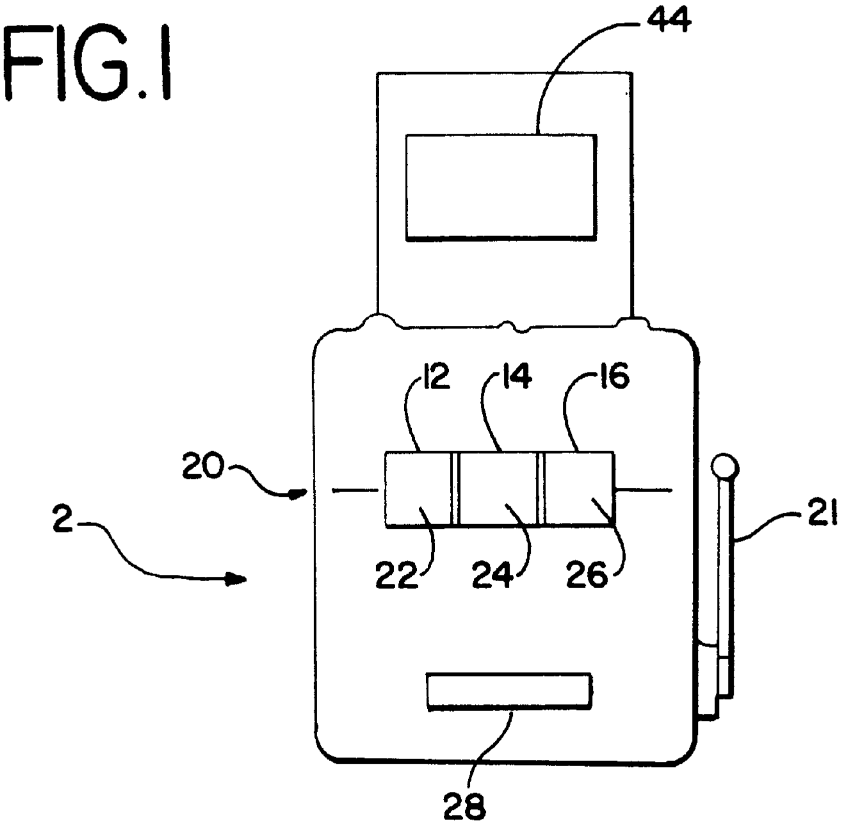
FIG. 1 is a simplified illustration of a spinning reel slot machine according to a preferred embodiment of the present invention.
Figure 2:
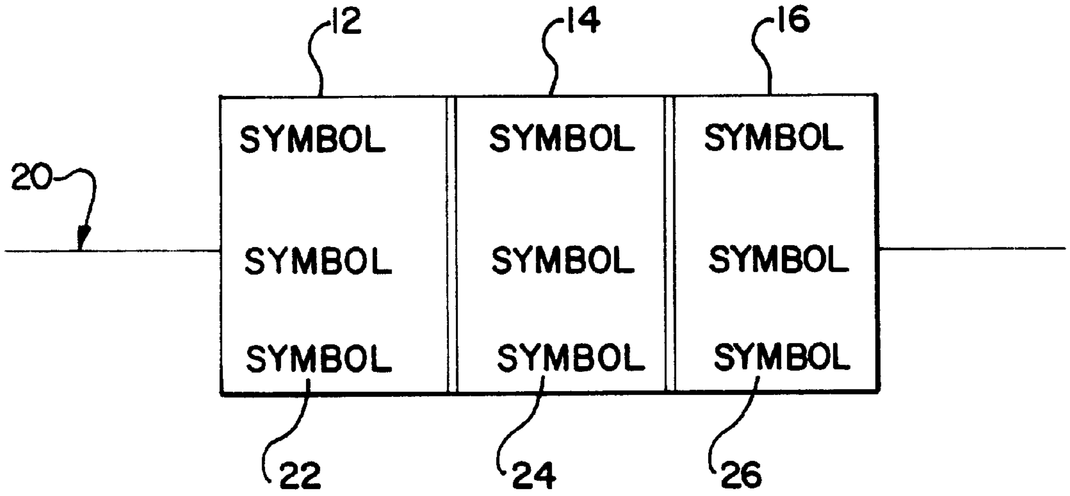
FIG. 2 is an enlargement of the slot machine display showing how physical symbols appear on, above and below the payline in the preferred embodiment.
Figures 4, 6:
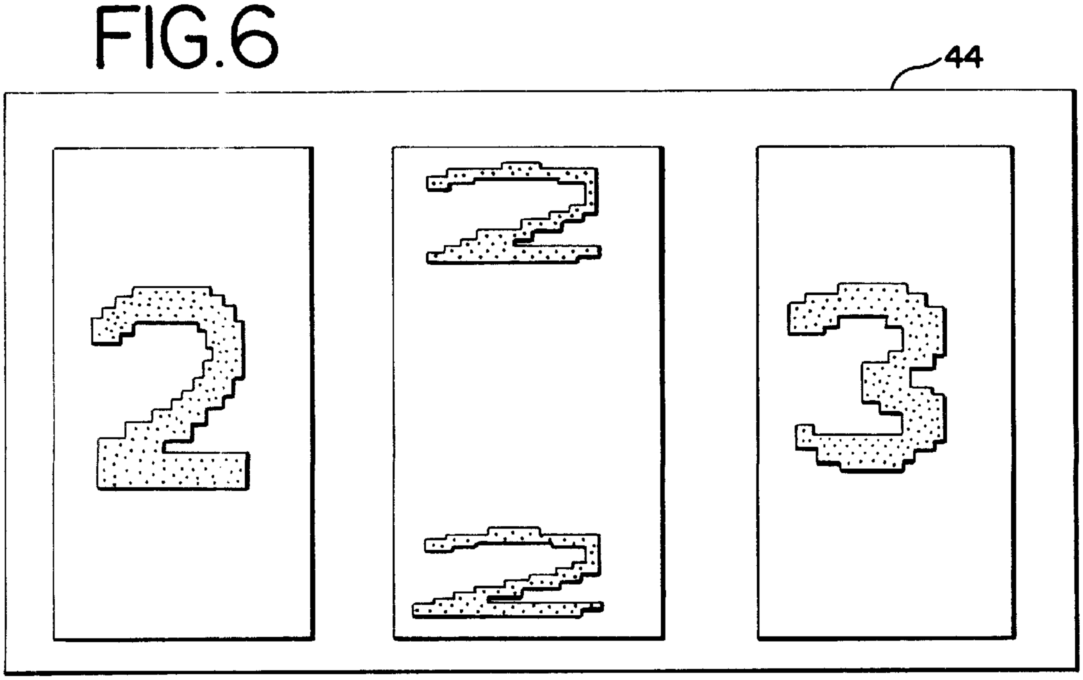
FIG. 4 is a table showing three sets of 22 symbols on the three reel strips according to a specific example of a first embodiment of the present invention.
FIG. 6 shows the contents of the display shown in FIG. 1 during operation of a secondary game.

FIG. 1 shows an overall view of a first embodiment of the present invention, there is provided a spinning reel slot machine 2 comprising a cabinet 10 having windows 12, 14, 16 on the front which can be viewed by a player standing in front of the machine. As in most spinning reel slot machines, behind the window three reels 22, 24 and 26 are mounted for rotation. A portion of the outer surface of each reel is visible through the corresponding window as shown in FIG. 2. Each reel has 22 regularly spaced locations which either have symbols represented thereon or are left blank. The spatial allocation of these symbols is shown in FIG. 4. Each window is preferably dimensioned to display three consecutive locations on each reel at a time. The reels are each individually driven by a stepper motor which is controlled by a microprocessor as is known in this art. Circuitry is provided so that the microprocessor can send instructions for the reel to spin and to stop at a predetermined position. As shown in FIG. 2, whenever all the reels are stopped, a three-by-three rectilinear array of symbols is displayed. The row of three symbols across the center of this three by three array is deemed to be located on the payline 20, and the symbols appearing on this line determine the prizes paid out as described below. For a typical 22 stop reel, the symbols and frequency of occurrence are selected based on probability analysis. These symbols are designed in an eye-catching manner.

A handle 21 or a switch button is provided on the machine, by which a player can commence cycles of the game after inserting money or tokens to buy credits.

To operate the game, a player puts coins or bills into the game and the value is determined by the processor and stored in computer memory. The number of credits thus purchased is displayed on another display not shown. Depending on how many modes the game has, different switch buttons are provided to start the game in the appropriate mode.

If sufficient credit has been purchased, the handle 21 can be pulled or the appropriate switch button operated. This commences a cycle of operation of the machine, whereby the reels 22, 24, 26 begin to spin under the control of the game microprocessor. The machine enters the mode corresponding to the number of credits which have been wagered, and deducts the appropriate number of credits from the stored value.

Figure 3:
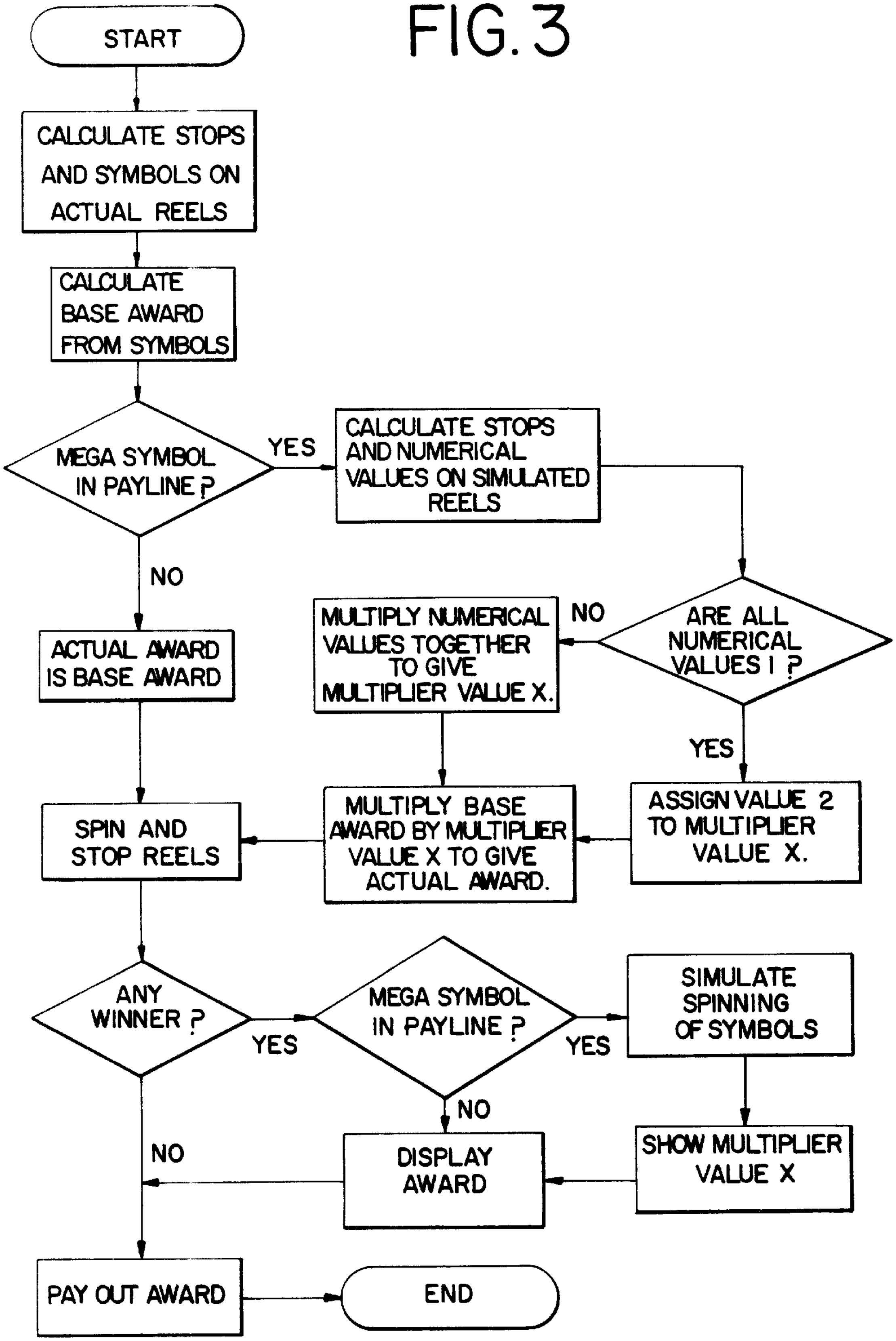
FIG. 3 is a flowchart showing a specific embodiment of the preferred embodiment of the present invention.

The operation of the game when a cycle of operation is commenced is hereinafter described with reference to FIG. 3. The microprocessor generates one or more random numbers to determine what the symbols on the payline will be. Typically, the memory contains a look up table representing the symbols, as shown in FIG. 4. The processor assigns the symbols shown to registers in memory for use in calculating the payoff. The microprocessor then determines if the combination is a winning combination as described in detail below, and calculates any payoff depending on the symbols showing. A specific example of such a calculation is described later. Typically, payoffs are all based on multiples of the smallest number of credits needed to play a game. However, some additional inducement may be expressed to encourage multiple credit play.

Once all calculations have been done, the microprocessor spins the reels and causes the reels to stop at the appropriate locations corresponding to the random number selected for each reel. Usually, the processor stops the left reel 22 first, followed by the center reel 24 and finally the right reel 26. When the reels have stopped spinning, any win is displayed and the payoff is ether released into a coin discharge trough 28 or added to the stored credits.

An example of a specific embodiment will now be described in detail. It has four modes of play referred to as 1 Coin, 2 Coin, 3 Coin and MaxBet modes and requiring 1, 2, 3 or 4 credits, respectively.

The symbols in this example of the embodiment are 1BAR, 2BAR, 3BAR, MEGA, STAR, SEVEN and BLANK, and their distribution on the reel strips is shown in FIG. 4. The bar symbols are referred to generically as BARS.

The normal payoff for any winning combination on the payline 20 is shown in the table of FIG. 5. The prize paid out for each of the winning combinations listed in the columns labeled Reel 1–Reel 3 is shown in the 1 Coin, 2 Coin, 3 Coin and MaxBet (4 coins) columns and depending on the number of credits bet. The game program checks the selected combination against each of the combinations in FIG. 5, starting with the highest paying win at the top of the table and progressing to the lowest paying win at the bottom. The numeric value representing the payoff is a multiple of one credit. As can be seen, the MEGA symbol is wild and can replace any symbol in a winning combination.

Importantly, when a winning combination including a MEGA symbol occurs on the payline, a secondary game is commenced in a dot matrix display 44 shown in FIG. 1, which generates a multiplier value by which to multiply the secondary payoff associated with the winning combination.

When the secondary game is commenced by the occurrence of the MEGA symbol, graphical representations of three reel strips are shown on the display 44, as shown in FIG. 6. The computer generated reel strips of the secondary game have 36 symbol locations. They do not show symbols as do physical reels 22, 24 and 26, but instead show multiplier values. Examples of these computer generated reel strips are shown in FIGS. 7*a* and 7*b*. In this example, these multiplier values for each reel range from 1 to 3 in FIG. 7*a* and 1 to 5 in FIG. 7*b*. The multiplier value 1 may be represented by a blank display, as multiplication by one has no effect on the resulting payoff. Thus, the middle reel strip in it configuration shown in FIG. 6 represents the number 1.

Figure 10:
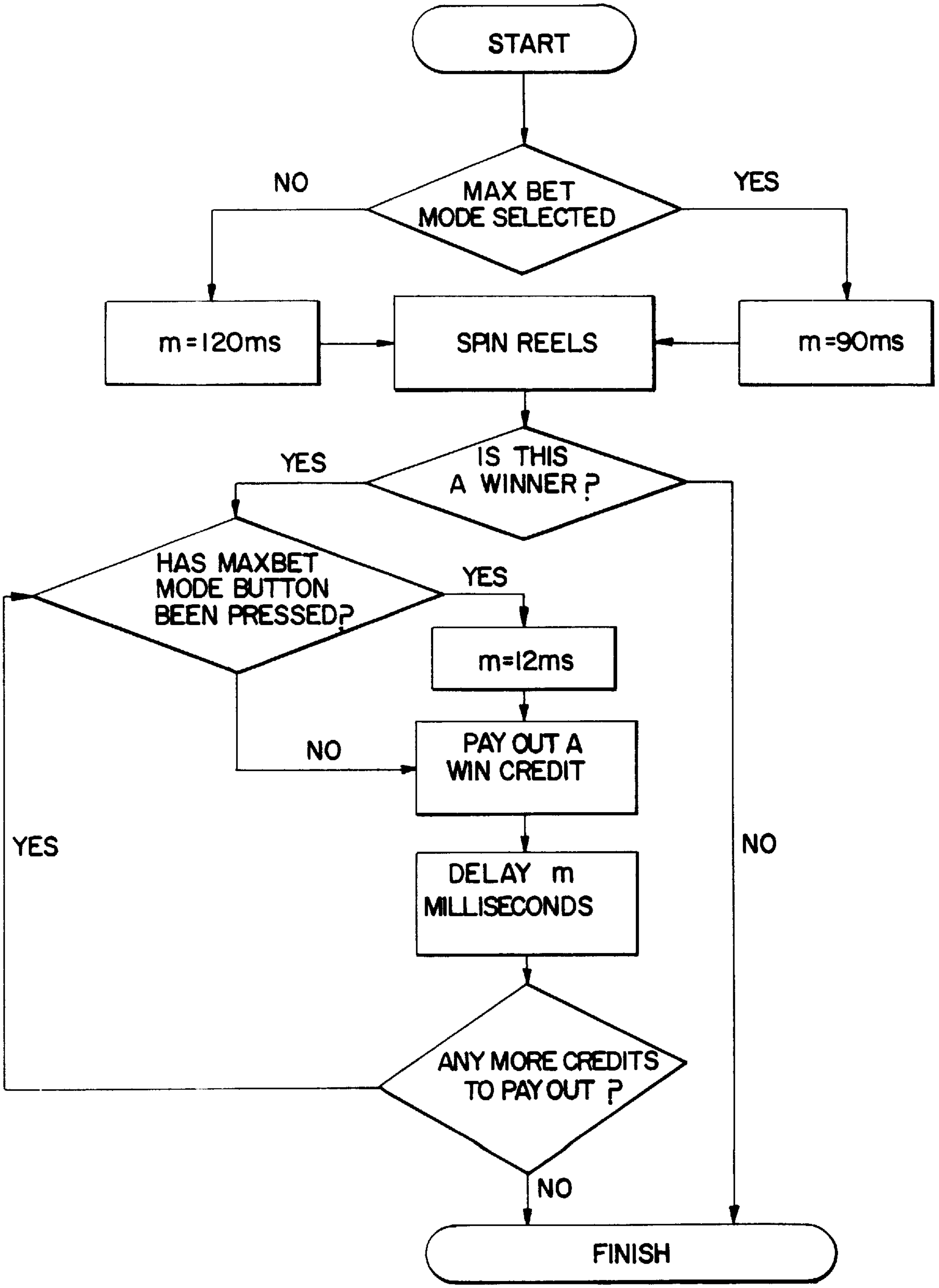
FIG. 10 is a flowchart representing the payoff scheme of a specific embodiment of the present invention.

The microprocessor runs a computer program, discussed further in connection with FIG. 10, which generates visual representations of spinning reels on the display 44. The microprocessor, as with the physical reel selection, generates random values representing the positions (multiplier values) which it will display. The computer program stops the animations at the appropriate time to display the selected multipliers across the payline of the video simulated reel display.

The multiplier values displayed along the payline are multiplied together to produce a combined multiplier value X by which the regular game payoff will be multiplied. For example; if the regular payoff is 30 credits, and multiplier values displayed on display 44 are 2, blank and 3, as shown in FIG. 6, the multiplier value will be 6 (2×1×3), and the payoff will be 180 credits (6×30).

The mean of the values on each of the reel strips are $\mu_1$, $\mu_2$ and $\mu_3$, it is elementary to show that the expected value for the multiplier X is as follows:

$$X=\mu_1\mu_2\mu_3 \quad (1)$$

However, if all the symbols in the computer generated payline are blank (ie. all the values in the, payline are 1), this multiplier value X will be 1. The player would not then receive an enhanced payoff for achieving a MEGA symbol in the physical reel game. In order to overcome this, in the event that the product of the three multiplier values of the computer generated reels is 1, the value of multiplier X is arbitrarily set to 2.

If the probabilities of obtaining a 1 on each of the computer generated reel strips is $p_1$, $p_2$ and $p_3$ respectively, it is straightforward to show that the expected value$_m$X of the modified multiplier will be:

$$X_m=\mu_1\mu_2\mu_3+p_1p_2p_3 \quad (2)$$

In the case of this specific embodiment, one set of computer generated reel strip values is used in the first three modes (FIG. 7*a*), and a different set is used in the MaxBet mode (FIG. 7*b*). The computer generated reel strips used in the first three modes have values ranging from 1 to 3. The maximum multiplier which can be obtained with such a range of values is accordingly 27. The expected multiplier value generated by these reel strips is referred to hereinafter as $X_1$. Using equation 2, it is easy to calculate the value $X_1$ with the values of the reel strips shown in FIG. 7*a*. The expected value of $X_1$ is 4.44.

The computer generated. reel strips of the MaxBet mode are shown in FIG. 7*b,* and contain values from 1 to 5. The maximum multiplier which can be obtained with such a range of values is accordingly 125. If this multiplier value is obtained in conjunction with the maximum paying winning combination of 200 credits, a win of 25,000 credits can be obtained. The expected multiplier value generated by the sets of values shown in FIG. 7*b* is referred to hereinafter as $X_2$. Using equation 2, it is easy to calculate the value $X_2$ with the values of the reel strips shown in FIG. 7*b*. The expected value of $X_2$ is 7.08.

Instead of the arrangement shown in FIGS. 7*a* and 7*b,* an extended reel with mapping can be used for the secondary games as shown in FIGS. 7*c* and 8. The extended reel allows greater flexibility in the display of multiplier values on the simulated reel display 44. This allows the game to be percentaged more easily and makes for a more exciting display above and below the simulated payline. The extended reel can either have a larger number of "stop" positions or a mapping scheme can be utilized. In the latter case, for example, the 36 "stops" are mapped to a few prearranged video display frames of reel strips as represented in FIG. 8. Increasing the number of stops mapped to the frames allows changes in the hold percentage.

Referring to FIG. 5, note that the payoff formula for the 3 credit mode is the same as the same as the payoff formula for the 4 Credit mode. However, payoff in the 4 credit (MaxBet) mode is increased because the expected multiplier value $X_2$ (7.08) is significantly greater than the expected multiplier value $X_1$ (4.44).

The overall payoff of the machine in each of the four modes can easily be calculated by multiplying the expected payoffs for each of the symbol combinations shown in the "Predicted Value" columns of FIG. 5 by the proportion of the reel combinations which will generate each payoff, and then summing the result. These products, and the relevant sums are shown in FIG. 9 for each of the four modes. Dividing these sums by the number of credits per play for each mode yields, and multiplying by 100 yields the percentage payoff in each case, and the associated percentage payoffs are also shown in FIG. 9. The proportion of the reel combinations which will generate each payoff is calculated by dividing the number of reel combinations yielding that payoff value, as shown in the "No of ways to achieve" column of FIG. 5, by the total number of reel combinations, which in this case is 10,648 ($22^3$).

It can be seen from the Percentage Payoffs shown in FIG. 5 that in this example it is more advantageous for a player to play in the 3 credit mode than the 2 or 1 credit mode, and it is even more advantageous to play in the 4 credit mode. The reason is it more advantageous to play in the 3 credit mode than the 1 or 2 credit modes is that the payoff for a STAR MEGA STAR win ($200X_1$) is disproportionately larger than the values in the other two modes ($60X_1$ and $120X_1$).

The procedure followed when a win is paid out is shown in FIG. 10. When the machine pays out after a win, a predetermined time delay is provided between the counting out of each credit to be paid. In this example the standard delay is 120 milliseconds (ms) per credit. However, if the game is in MaxBet mode, this delay is automatically set to 90 ms per credit, as more credits are likely to be won, and the player is likely to be more of an expert at the game.

In any case, if the player presses the MaxBet mode button after the reel spin is complete and before or during credit pay out, the delay on the remaining credits is set to 12 ms per credit won. FIG. 10 illustrates the program flow chart permitting the implementation of this enhanced payout feature.

In modifications of the described embodiment, different values for the prizes and different symbols on the physical reels could be used. More reels, could be provided to provide more combinations, or more symbols could be provided on each reel. Extra features, such as nudges and holds, well known in the art could also be added to enhance gameplay.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A gaming machine including a set of spinning reels having a plurality of symbols thereon, means for spinning and stopping said reels to display symbols on a payline and a processor operating according to a game program for controlling the spinning and stopping means, said processor including:

a) means for randomly selecting symbols to be displayed by said spinning reels;

b) means for determining if the selected symbols constitute a winning combination, and, if so, a corresponding prize amount; and c) means for paying out said prize as a plurality of credits, said means for paying out prizes including means for adjusting the rate the credits are consecutively dispensed during a credit payout, the adjusting means includes means for a player to select the payoff rate.

2. A gaming machine according to claim 1 wherein said means for adjusting said rate comprises a player operable input device.

3. A gaming machine according to claim 1 wherein said game program provides different modes which can be selected by a player of said game, and wherein said means for adjusting said rate adjusts said rate in accordance with the mode selected.

4. A method of operating a gaming machine including a set of spinning reels having a plurality of symbols thereon, means for spinning and stopping said reels to display symbols on a payline, and a processor operating according to a game program for controlling the spinning and stopping means, said method of operating comprising the steps of:

a) randomly selecting symbols to be displayed by said spinning reels;

b) determining if the selected symbols constitute a winning combination, and, if so, a corresponding prize amount; and c) paying out said prize as a plurality of credits, wherein said step of paying out prizes comprises a further step of adjusting the rate the credits are consecutively dispensed during a credit payout in accordance with a payoff rate selected by the user.

5. A method of operating a gaming machine according to claim 4 wherein said gaming machine comprises user operable input means, said step of adjusting comprising adjusting said rate in response to operation of said user operable input means.

6. A method of operating a gaming machine according to claim 4 wherein said game program provides different modes which can be selected by a player of said game, and wherein said step of adjusting said rate comprises adjusting said rate in accordance with the selected mode.

* * * * *